(12) United States Patent
Ghodrati

(10) Patent No.: US 10,996,130 B2
(45) Date of Patent: May 4, 2021

(54) TOILET BOLT CAP WITH A LIQUID SENSOR

(71) Applicant: Mahdi Ghodrati, Ancaster (CA)

(72) Inventor: Mahdi Ghodrati, Ancaster (CA)

( * ) Notice: Subject to any disclaimer, the term of this patent is extended or adjusted under 35 U.S.C. 154(b) by 648 days.

(21) Appl. No.: 15/577,181

(22) PCT Filed: Jan. 27, 2016

(86) PCT No.: PCT/CA2016/050066
§ 371 (c)(1),
(2) Date: Nov. 27, 2017

(87) PCT Pub. No.: WO2016/187700
PCT Pub. Date: Dec. 1, 2016

(65) Prior Publication Data
US 2018/0180508 A1    Jun. 28, 2018

Related U.S. Application Data

(60) Provisional application No. 62/230,093, filed on May 28, 2015.

(51) Int. Cl.
| | |
|---|---|
| *G01M 3/04* | (2006.01) |
| *E03D 11/16* | (2006.01) |
| *F16B 37/14* | (2006.01) |

(52) U.S. Cl.
CPC ............ *G01M 3/042* (2013.01); *E03D 11/16* (2013.01); *F16B 37/14* (2013.01)

(58) Field of Classification Search
CPC ......... G01M 3/042; E03D 11/16; F16B 37/14
See application file for complete search history.

(56) References Cited

U.S. PATENT DOCUMENTS

| | | | | |
|---|---|---|---|---|
| 1,571,657 A | * | 2/1926 | Wilkinson | ............... G01M 3/00 73/46 |
| 2,601,840 A | * | 7/1952 | Smith | .................... F16L 23/167 116/206 |

(Continued)

FOREIGN PATENT DOCUMENTS

| | | |
|---|---|---|
| CA | 2160514 A1 | 4/1997 |
| GB | 2270767 | 3/1994 |

(Continued)

OTHER PUBLICATIONS

International Search Report dated May 13, 2016 for International Appl No. PCT/CA2016/050066.

*Primary Examiner* — Nimeshkumar D Patel
*Assistant Examiner* — Tania Courson
(74) *Attorney, Agent, or Firm* — Knobbe, Martens, Olson & Bear, LLP

(57) ABSTRACT

A toilet bolt cap liquid sensor including an outer shell defining an interior cavity sized to receive a portion of a toilet bolt and house a liquid sensor; the liquid sensor including an exposed surface to the interior cavity. The liquid sensor can be used in a leak detector system for a toilet comprising: a flat base sheet bound by an outer perimeter an interior aperture; a wick material barrier coupled to the base between the aperture and the outer perimeter in a continuous or substantially continuous strip around the aperture; a wick material projection extending from the wick material barrier; and a toilet bolt cap including an outer shell defining an interior cavity for receiving an end of a toilet bolt, the toilet bolt cap housing the liquid sensor the liquid sensor including an exposed surface to the interior cavity for contact in fluid communication with the wick material projection.

14 Claims, 10 Drawing Sheets

(56) References Cited

U.S. PATENT DOCUMENTS

| | | | | |
|---|---|---|---|---|
| 2,918,033 A * | 12/1959 | Snyder | | G01M 3/12 |
| | | | | 116/206 |
| 2,918,893 A * | 12/1959 | Norton | | G01M 3/12 |
| | | | | 116/206 |
| 3,085,424 A * | 4/1963 | Berg | | G01N 31/222 |
| | | | | 73/29.02 |
| 3,108,566 A * | 10/1963 | Chatlos | | G01N 31/222 |
| | | | | 116/206 |
| 3,122,124 A * | 2/1964 | Yocum | | F25B 41/006 |
| | | | | 116/206 |
| 3,131,638 A * | 5/1964 | Wilson | | F04B 43/009 |
| | | | | 92/5 R |
| 3,225,555 A * | 12/1965 | Chatlos | | F25B 41/006 |
| | | | | 62/129 |
| 3,485,085 A | 12/1969 | Hawkins, Jr. | | |
| 4,864,847 A * | 9/1989 | Anderson | | G01M 3/04 |
| | | | | 73/40.7 |
| 4,888,979 A * | 12/1989 | Steeper | | G01M 3/223 |
| | | | | 73/40.7 |
| 5,170,659 A * | 12/1992 | Kemp | | F16L 23/167 |
| | | | | 137/312 |
| 5,440,917 A * | 8/1995 | Smith | | G01M 3/16 |
| | | | | 340/605 |
| 5,461,904 A | 10/1995 | Baker | | |
| 5,608,922 A * | 3/1997 | Lewis | | E03D 11/16 |
| | | | | 137/312 |
| 5,830,558 A | 11/1998 | Barnholtz | | |
| 5,898,954 A * | 5/1999 | Provenzano | | E03D 11/16 |
| | | | | 4/252.1 |
| 6,128,947 A | 10/2000 | Anderson, Sr. | | |
| 7,069,603 B2 * | 7/2006 | Flushing | | E03D 11/16 |
| | | | | 4/251.1 |
| 7,213,534 B2 * | 5/2007 | Siikaluoma | | G01M 3/042 |
| | | | | 116/200 |
| 7,316,154 B1 * | 1/2008 | Bennett | | F16J 15/064 |
| | | | | 277/320 |
| 7,716,967 B2 * | 5/2010 | Woods | | G01M 3/223 |
| | | | | 73/46 |
| 7,864,064 B2 * | 1/2011 | Lawson | | G01M 3/184 |
| | | | | 340/604 |
| 8,289,173 B2 * | 10/2012 | Ben-Mansour | | F16L 21/065 |
| | | | | 340/605 |
| 9,033,633 B2 | 5/2015 | Henry | | |
| 9,482,589 B2 * | 11/2016 | Ghodrati | | G01M 3/04 |
| 9,677,685 B2 * | 6/2017 | Hein | | F16K 37/0075 |
| 2005/0160963 A1 | 7/2005 | Siikaluoma et al. | | |
| 2007/0204634 A1 * | 9/2007 | Cho | | F16K 27/067 |
| | | | | 62/126 |
| 2008/0034763 A1 * | 2/2008 | Cho | | F25B 41/006 |
| | | | | 62/129 |
| 2011/0209278 A1 | 9/2011 | Hatt | | |
| 2013/0270141 A1 * | 10/2013 | Anderson, Sr. | | G01M 3/38 |
| | | | | 206/459.1 |
| 2014/0053326 A1 | 2/2014 | Kennedy | | |
| 2014/0208831 A1 | 7/2014 | Ghodrati | | |

FOREIGN PATENT DOCUMENTS

| | | |
|---|---|---|
| JP | H0-7294367 A | 11/1995 |
| JP | 2007-218884 A | 8/2007 |
| JP | 2008-128666 A | 6/2008 |
| JP | 2008-163661 A | 7/2008 |
| WO | WO 2013/053059 A1 | 4/2013 |

* cited by examiner

PRIOR ART

PRIOR ART

A

PRIOR ART

B

PRIOR ART

A

B

C

D

G

H

TOILET BOLT CAP WITH A LIQUID SENSOR

BACKGROUND OF THE INVENTION

Field of the Invention

The present invention relates to a toilet bolt cap, and more particularly a toilet bolt cap that can be used in combination with a leak detector configured to detect leaks at a junction of a toilet bowl and a flanged waste water drain pipe.

Description of the Related Art

Leaks from pipe connections in residential and commercial properties is a significant source of property damage. Specifically, the piped connections to wastewater plumbing fixtures such as toilets, bathtubs, standing showers, sinks and the like, are often obstructed from view and leaks can go undetected until water seepage has caused structural damage such as floor deterioration and mold growth. An undetected leak from a toilet drain pipe connection is a common problem.

In toilets, waste water exits to a flanged drain pipe in a bathroom floor. Toilets are typically bolted to a flange mounted to the floor and coupled to the drain pipe. Toilet installations can include a gasket, usually a wax or rubber ring, disposed between the drain pipe and the toilet to produce a liquid-tight seal between the drain pipe and the toilet. For example, a wax ring can be coupled to the discharge outlet portion of the toilet by pressing the wax ring onto the discharge outlet portion, thereby deforming the wax ring to the contour of the discharge outlet portion. The toilet is then set on the flange such that the wax ring is axially aligned with the flange. Applying downward pressure on the toilet causes the wax ring to press onto the flange, thereby deforming the wax ring to the contour of the flange to produce the seal between the drain pipe and the discharge outlet portion of the toilet. A similar sealing process may be accomplished with a rubber ring or other types of gaskets.

A leak through the gasket seal can go undetected as the seal is obstructed from visual inspection by the toilet structure, typically the toilet base. A slow leak often does not extend a pool of water on the floor surface where the water may be detected by visual inspection. Rather a slow leak often allows water to seep into or under the floor deteriorating the floor structure and/or the ceiling structure underneath the floor. Water damage and mold growth in a ceiling underneath a toilet can be the first sign of a leak in the gasket seal.

Thus, it is important that any leakage is detected, contained and repaired quickly. Early detection of leaks avoids more serious problems caused to the pipe structures and surroundings that may occur if leaks remain undetected until a relatively late stage.

Various leak detectors have been developed to address the problem of leaks in piping connections that are in visually obstructed locations such as a toilet seal with a drain pipe. Examples of such leak detectors are disclosed in the following patent documents: U.S. Pat. No. 6,128,947 by Anderson (published 10 Oct. 2000), US20050160963 by Siikaluoma et al (published 28 Jul. 2005), U.S. Pat. No. 3,485,085 by Hawkins (published 23 Dec. 1969), U.S. Pat. No. 5,461,904 by Baker (published 31 Oct. 1995), and US20110209278 by Hatt (published 1 Sep. 2011). These leak detectors are susceptible to yielding a false positive or a false negative signal. A false positive signal occurs when a detected liquid is an exogenous liquid and not the target liquid flowing through a piped connection. For example, when liquids are used to wash structures or surfaces proximal to a piped connection, a signal due to the washings would be a false positive signal. A false negative signal can arise when a leak is sufficiently slow that the liquid evaporates prior to contacting a liquid sensor in a leak detector. Co-pending and co-owned US2014/0208831 by Ghodrati (published 31 Jul. 2014) addresses problems of a false positive or false negative signal, but extends a liquid sensor of the leak detector outside a toilet base with an optional reversible attachment to a toilet base. Extending the liquid sensor outside the toilet base exposes the liquid sensor to potential mechanical contact with those using or cleaning the toilet.

Accordingly, there is a continuing need for alternative leak detectors and/or liquid sensors for for wastewater piped connections to wastewater plumbing fixtures.

SUMMARY OF THE INVENTION

In an aspect there is provided a leak detector system for a toilet comprising: a flat base sheet bound by an outer perimeter an interior aperture; a wick material barrier coupled to the base between the aperture and the outer perimeter in a continuous or substantially continuous strip around the aperture; a wick material projection extending from the wick material barrier; and a toilet bolt cap comprising an outer shell defining an interior cavity for receiving an end of a toilet bolt, the toilet bolt cap housing a liquid sensor, the liquid sensor comprising an exposed surface to the interior cavity for contact in fluid communication with the wick material projection.

In another aspect there is provided a toilet bolt liquid sensor ring comprising:

a tubular outer shell comprising opposing first and second open axial ends defining an interior cavity sized to receive a portion of a toilet bolt and house a liquid sensor; the liquid sensor comprising an exposed surface to the interior cavity; the first open end comprising a first connector for reversible attachment to a washer; and the second open end comprising a second connector for reversible attachment to a dome.

In yet another aspect there is provided a pivotable toilet bolt cap comprising: a tubular portion and a dome portion; the tubular portion comprising opposing first and second open axial ends defining an interior cavity sized to receive a portion of a toilet bolt; the first open end comprising a first connector for reversible attachment to a washer; and the second open end comprising a pivot joint coupled to the dome portion, the dome portion pivotable from a closed position to an open position, the dome portion and the tubular portion defining a co-axial longitudinal axis in the closed position.

DETAILED DESCRIPTION OF PREFERRED EMBODIMENTS

Figure 1:
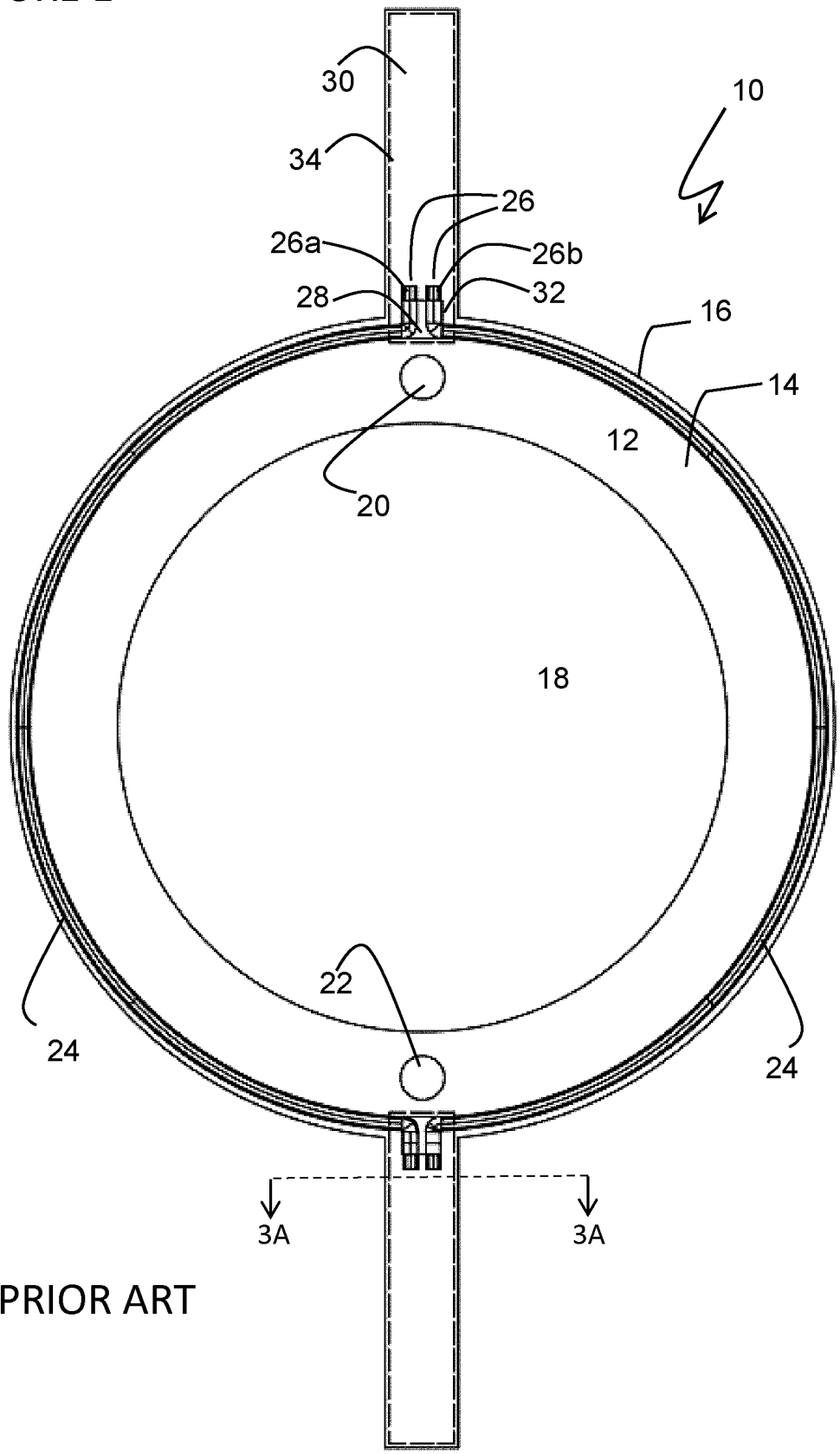
FIG. 1 shows a top plan view of a prior art leak detector.

Referring to the drawings, FIG. 1 shows a top view of a prior art leak detector 10 described in co-pending and co-owned US Patent Publication 2014/0208831 by Ghodrati (published 31 Jul. 2014) which is incorporated herein by reference. The leak detector can be installed in a flanged drain pipe connection with a toilet discharge outlet. The leak detector has the general shape of a pad comprising a flat base sheet 12 being bound by a first surface 14, a second surface (not shown), and an outer perimeter 16. The thickness of the base sheet defined as the distance between the first and second surfaces typically ranges from 0.1 millimeter to 3 mm. A first aperture 18 is located in a generally central portion of the sheet with the axial and radial directions of the first aperture defining the axial and radial directions of the leak detector. The first aperture size is related to the radial cross-sectional area or perimeter of the flange or the drain pipe. The first aperture is typically sized to be approximately equal to the radial cross-sectional area or perimeter of the flange or the outer surface of the drain pipe. Located proximal to the first aperture 18, second aperture 20 and third aperture 22 are sized for receiving bolts that secure a toilet to the flanged drain pipe and are aligned or spaced from each other according to corresponding bolt holes in the flange (shown in FIGS. 4 and 5).

A wick material located in between the first aperture 18 and the perimeter 16 of the base sheet is coupled to the base sheet typically using an adhesive that cannot be dissolved by water and that does not occlude the pores of the wick material. The wick material has two portions, a barrier portion 24 and a projection portion 26. The wick material barrier 24 is coupled to the base sheet as a strip that runs continuously around the first aperture 18 so that the wick material forms a barrier that surrounds the first aperture. The wick material also forms a projection 26 extending radially outward towards and beyond the outer perimeter 16 of the base sheet and generally in the same plane as the base sheet. Thus, each portion of the wick material has a different orientation—the barrier portion 24 is oriented to follow or contour the first aperture 18 while the projection portion 26 is oriented to extend radially outwards relative to the first aperture 18.

The wick material is continuous except for gap regions. The wick material barrier 24 is coupled to the base sheet as a strip that runs continuously around the first aperture 18 so that the wick material forms a barrier that surrounds the first aperture except at gap regions 28. The length of the gap region defined as the distance between the wick material barrier at either end of the gap region 28 is typically less than 10% of the total distance of the outer perimeter 16 or less than 10% of the total distance of the wick material barrier 24. On either end of each gap region 28, the wick material forms a pair of substantially parallel wick material projections 26, the first wick material projection 26a and the second wick material projection 26b, extending radially outward towards and beyond the outer perimeter 16 of the base sheet and generally in the same plane as the base sheet. Each of the first and second wick material projections 26a and 26b are integral with and are in fluid communication with the wick material barrier 24 and terminate at ends located radially outward from the base sheet perimeter 16.

Projection tabs 30 bound by first and second surfaces comprising a diffusible water soluble dye extend radially outward from the base sheet and define openings 32 aligned with the ends of each pair of wick material projections 26a,b. Each pair of wick material projections abuts a first surface of projection tab 30, while absorbent napkin 104 abuts a second surface of the projection tab 30. Wick material projections 26a,b contact and are in fluid communication with absorbent napkin 34 through opening 32.

Projection tab 30 has a slower water absorbent rate than wick material projections 26, while absorbent napkin 34 has a higher absorbent rate than wick material projections 26. Accordingly water flowing through wick material projections 26 is preferentially absorbed by absorbent napkin 34 and the wet absorbent napkin 34 becomes colored by the transfer of diffusible dye from the projection tab 30 to the absorbent napkin 34.

Figure 3:
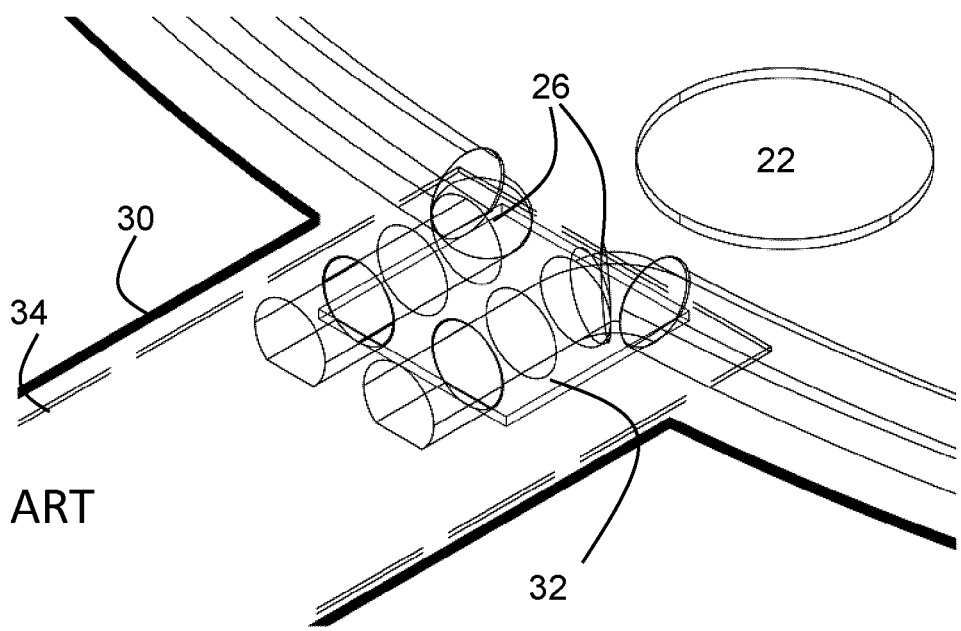
FIG. 3 shows (A) a magnified perspective view of the region around line 3A-3A and (B) a magnified perspective view of the region around line 3B-3B.
Figure 3:
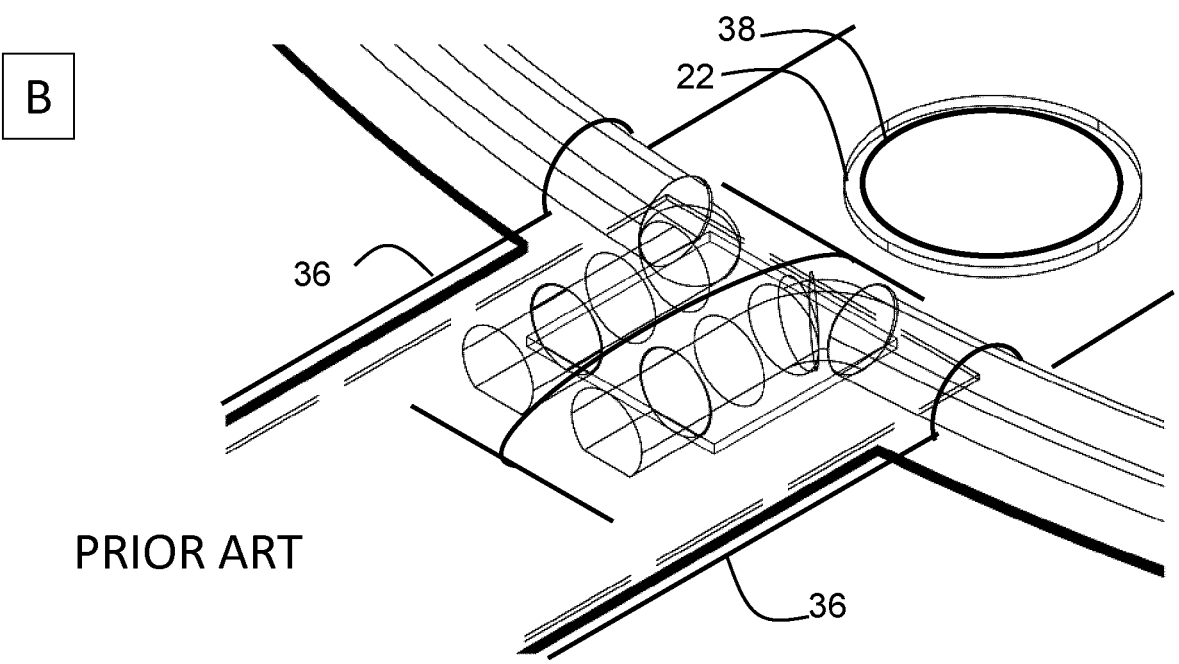

FIG. 3A shows a magnified perspective view of opening 32 more clearly showing the juxtaposition of wick material projections 26 and absorbent napkin 34 through opening 32 in projection tab 30.

Figure 2:
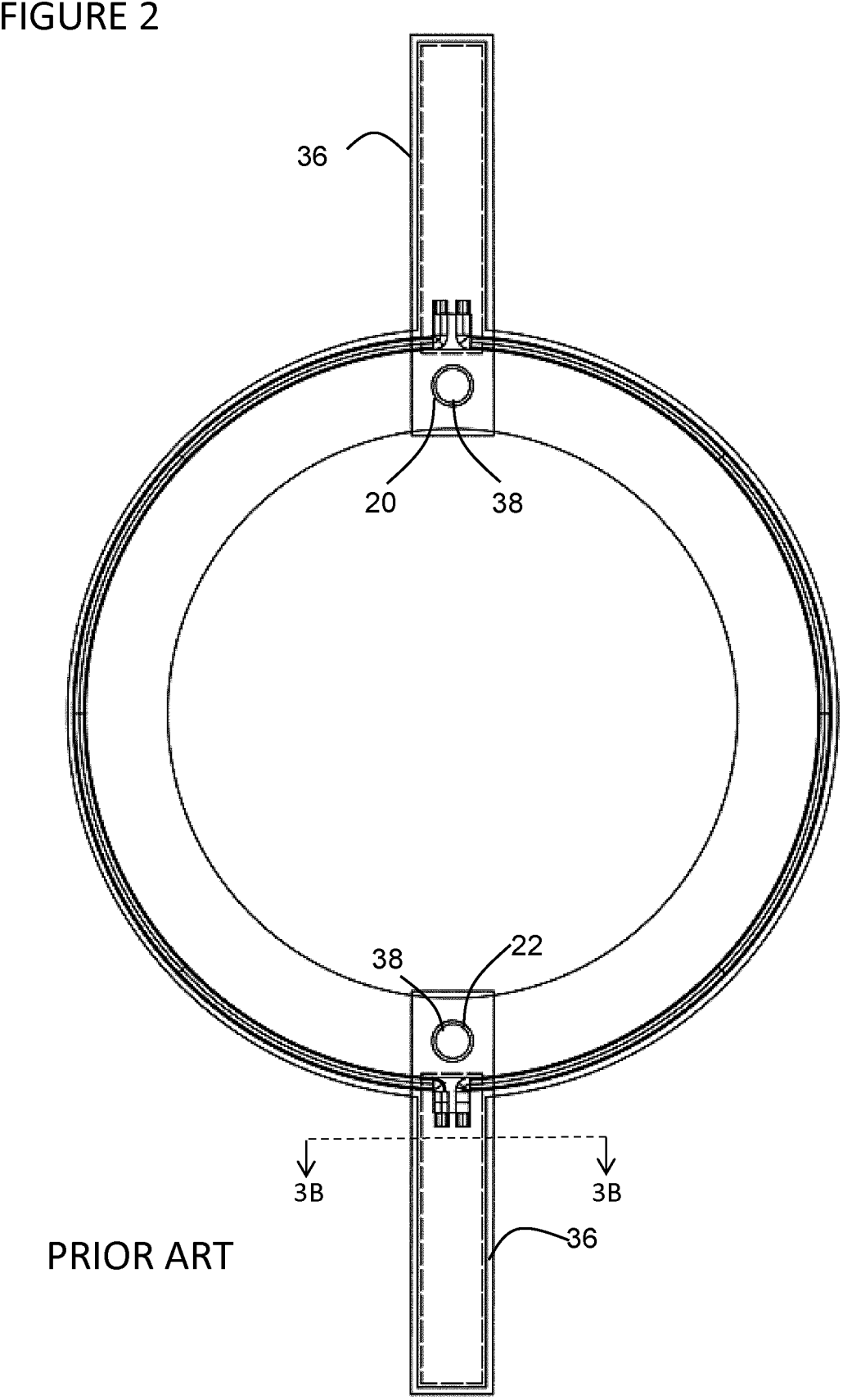
FIG. 2 shows a top plan view of the prior art leak detector shown in FIG. 1 further comprising a liquid-impermeable enclosure.

FIGS. 2 and 3B are identical to FIGS. 1 and 3B, respectively except for the addition of water-impermeable material that surrounds and forms a water-impermeable enclosure 36 containing wick material projections 26, projection tab 30 and absorbent napkin 34. The water-impermeable material 36 also partially covers second and third apertures 20 and 22. The water-impermeable material creates a seal around the perimeter of second and third apertures 20 and 22, and defines bolt openings 38 that have a smaller diameter than the second and third apertures 20 and 22. The bolt openings 38 are sized relative to the bolt diameter and receive bolts with a liquid-impermeable seal.

The area of the water-impermeable material is sufficient to form a water-impermeable enclosure 36 that encloses both the wick material projection 26 and the absorbent napkin 34. The absorbent napkin 34 and diffusible dye combination is an example of a liquid sensor. Many other liquid sensors may be used, for example litmus paper or other pH sensitive papers that change color when exposed to water. The length of the wick material projection 26, the length of the liquid sensor, or the combined length of both is equal to or greater than the distance from the flanged pipe to the edge of the structure causing its visual obstruction, for example a base of a toilet.

The water-impermeable enclosure 36 may be formed from a first water-impermeable sheet and a second water-impermeable sheet that are similarly sized and sealed along all their edges to form the water-impermeable enclosure 36 and to define an interior cavity 40 that houses the wick material projection 26, the liquid sensor and a volume capacity or reservoir for liquid. The water-impermeable enclosure 36 is typically composed of a thermoplastic material. At least a portion of the water-impermeable enclosure 36 is non-opaque (eg. transparent or semi-transparent) so that a color change of the liquid sensor can be readily determined by visual inspection.

Figure 4:
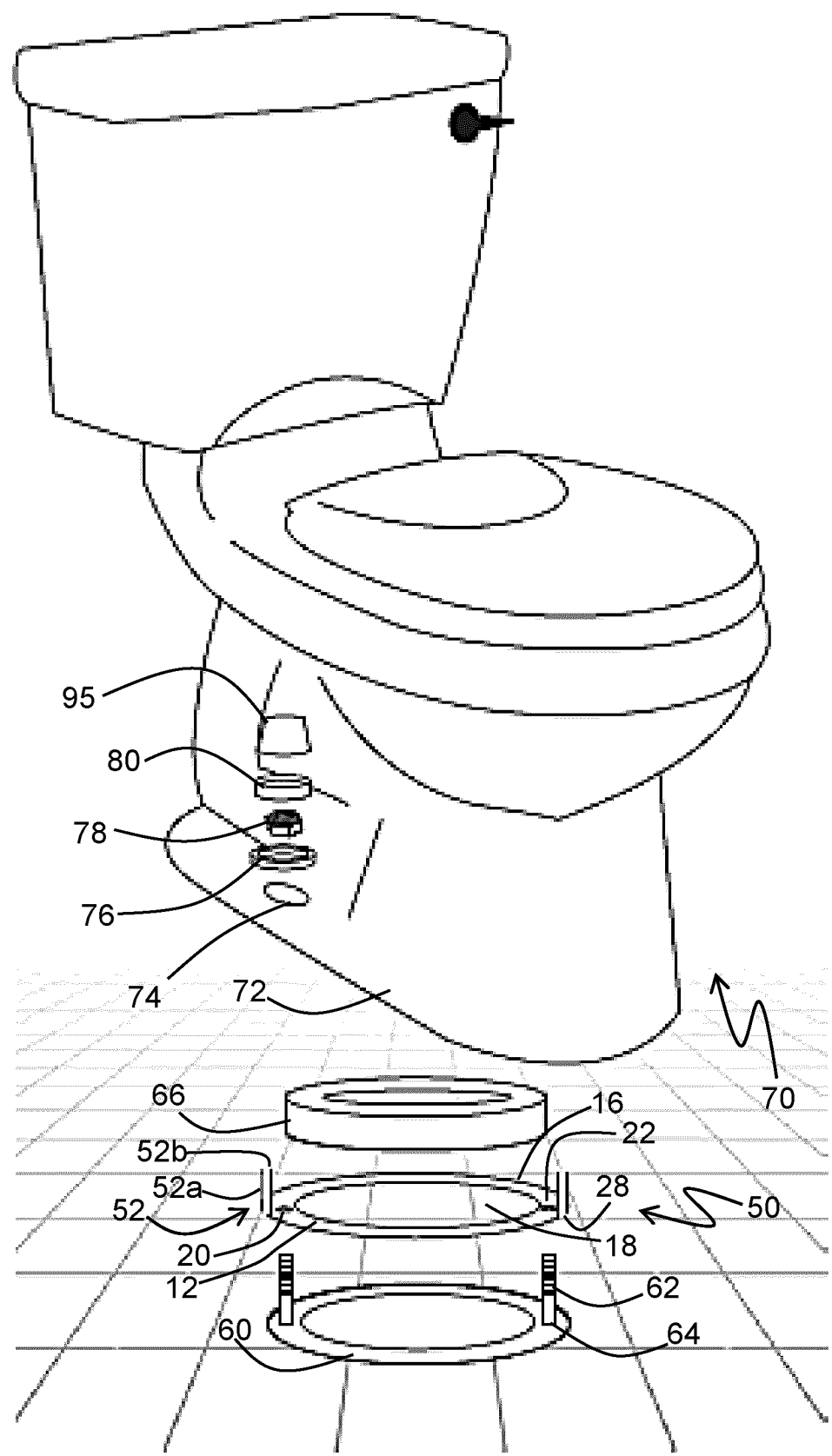
FIG. 4 shows an exploded view of a variant of the leak detector shown in FIG. 1 installed in combination with a toilet bolt cap liquid sensor.

FIG. 4 shows a variant of the leak detector shown in FIG. 1 installed in a toilet flange application in combination with a toilet bolt cap liquid sensor. The leak detector 50 shown in FIG. 4 differs from the prior art leak detector 10 shown in FIG. 1 in that the wick material projections point axially upwards relative to the base sheet and the wick material projections communicate with a liquid sensor housed in a toilet bolt cap.

Described in more detail, the leak detector 50 shown in FIG. 4 has the general shape of a pad comprising a flat base sheet 12 being bound by a first surface, a second surface, and an outer perimeter 16. A first aperture 18 is located in a generally central portion of the sheet with the axial and radial directions of the first aperture defining the axial and radial directions of the leak detector. The first aperture is typically sized to be approximately equal to the radial cross-sectional area of the opening of the flange or is sized to match a diameter ranging from the inner to outer surface of the drain pipe. Located proximal to the first aperture 18, second aperture 20 and third aperture 22 are sized for receiving bolts 62 that secure a toilet to the flanged drain pipe and are aligned or spaced from each other according to corresponding flange bolt holes 64 in the flange 60.

A wick material located in between the first aperture 18 and the perimeter 16 of the base sheet is coupled to the base sheet typically using an adhesive. The wick material has two portions, a barrier portion and a projection portion. The wick material barrier is coupled to the base sheet as a strip that runs continuously around the first aperture 18 so that the wick material forms a barrier that surrounds the first aperture. The wick material also forms a projection 52 extending axially upwards from the base sheet 12 and generally perpendicular to the base sheet 12. The wick material projection 52 extends from a location at or proximal to outer perimeter 16. Thus, each portion of the wick material has a different orientation—the barrier portion is oriented to follow or contour the first aperture 18 while the projection portion is oriented to extend axially upwards relative to the first aperture 18.

Similar to prior art leak detector 10 shown in FIG. 1, in the leak detector 50 the wick material is continuous except for gap regions. The wick material barrier is coupled to the base sheet as a strip that runs continuously around the first aperture 18 so that the wick material forms a barrier that surrounds the first aperture except at gap regions. On either end of each gap region 28, the wick material forms a pair of substantially parallel wick material projections 52, the first wick material projection 52a and the second wick material projection 52b, extending axially upwards from the base sheet and generally perpendicular to the base sheet. Each of the first and second wick material projections 52a and 52b are integral with and are in fluid communication with the wick material barrier portion and terminate at ends located axially above the base sheet 12.

Each of the first and second wick material projections 52a and 52b may optionally be coupled to a projection tab to provide structural support to maintain an axial orientation and gap alignment of the wick material projections. Wick material projections and/or portions of the base sheet 12 proximal to the wick material projections may optionally be enclosed in a liquid-impermeable membrane.

Figure 5:
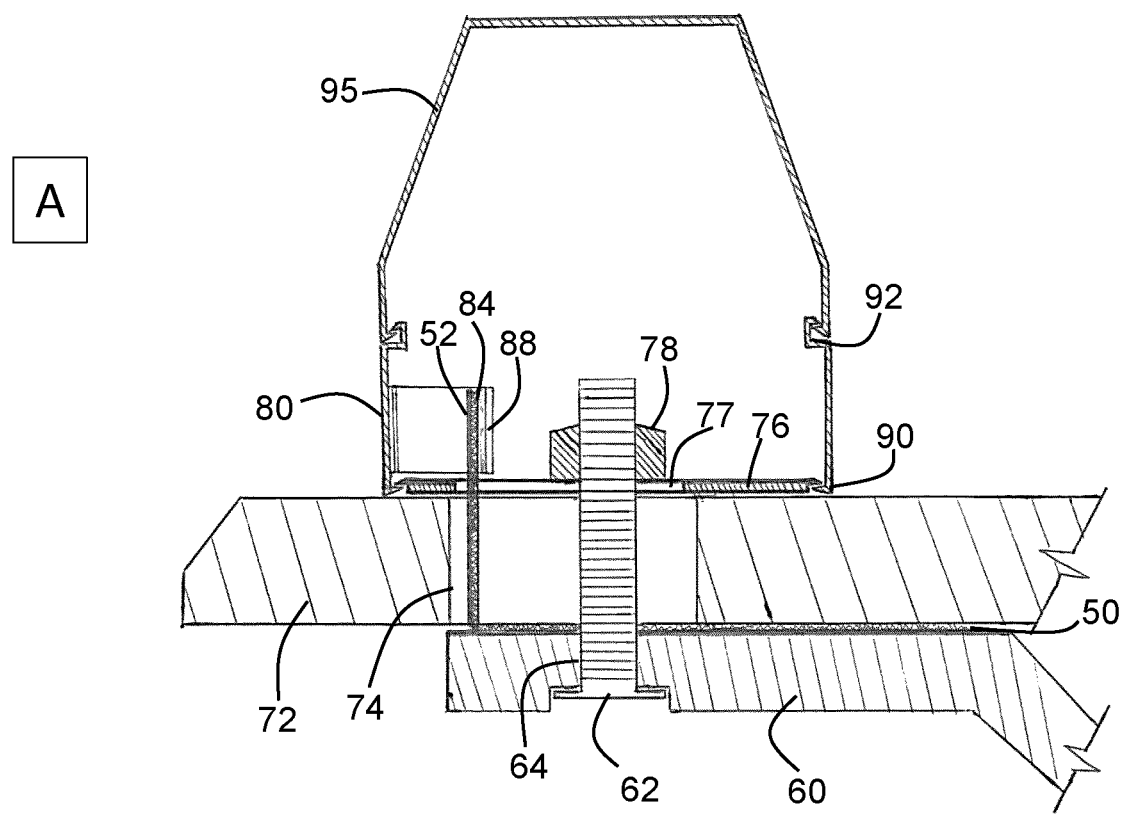
FIG. 5 shows an (A) axial cross-section view and (B) radial cross-section view of the toilet bolt cap liquid sensor shown in FIG. 4.
Figure 5:
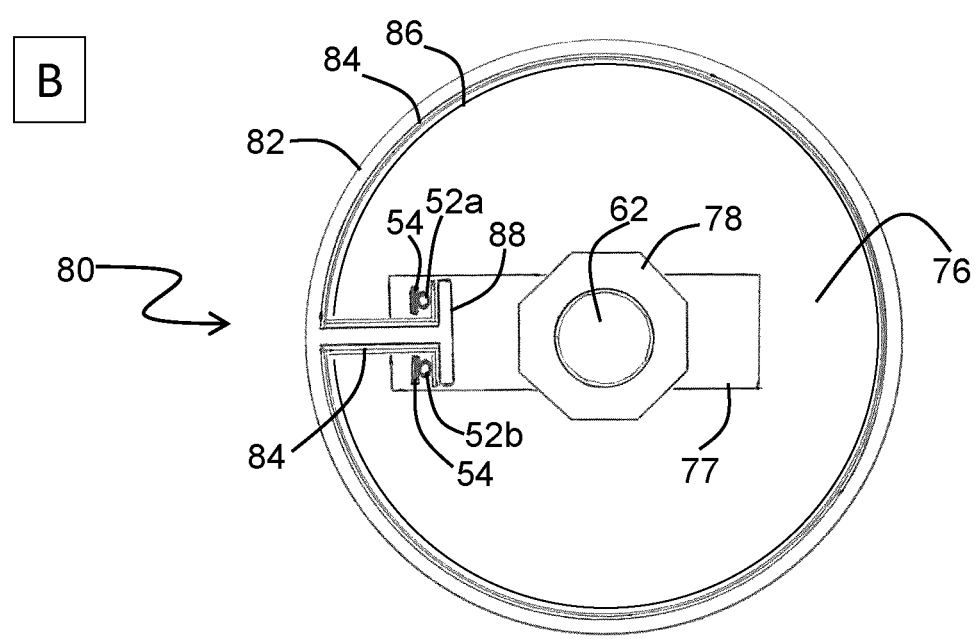
Figure 6:
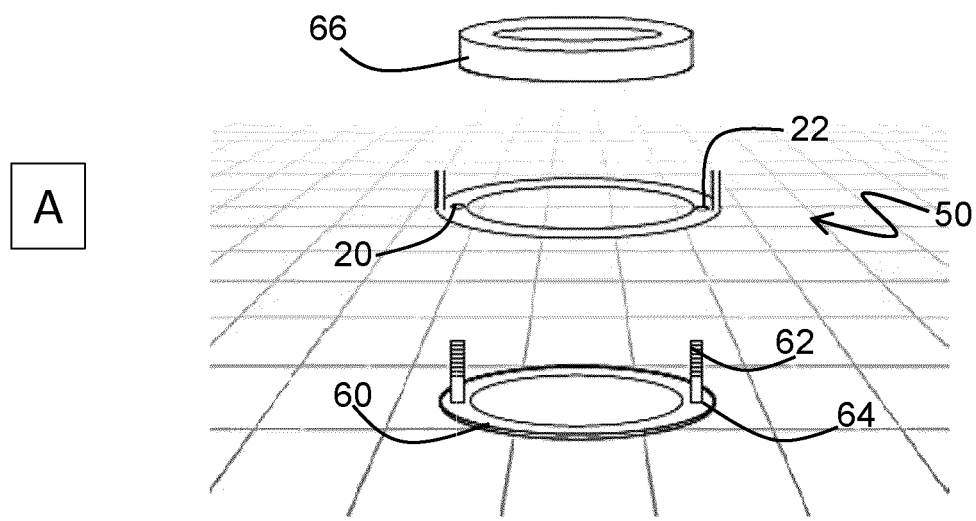
FIG. 6(A to H) show perspective views in sequence of an installation and use of the toilet bolt cap liquid sensor shown in FIG. 4.
Figure 6:
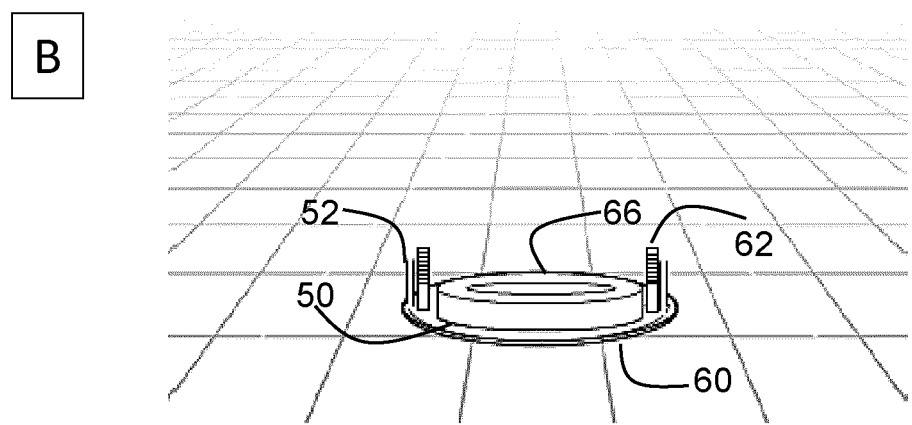
Figure 6:
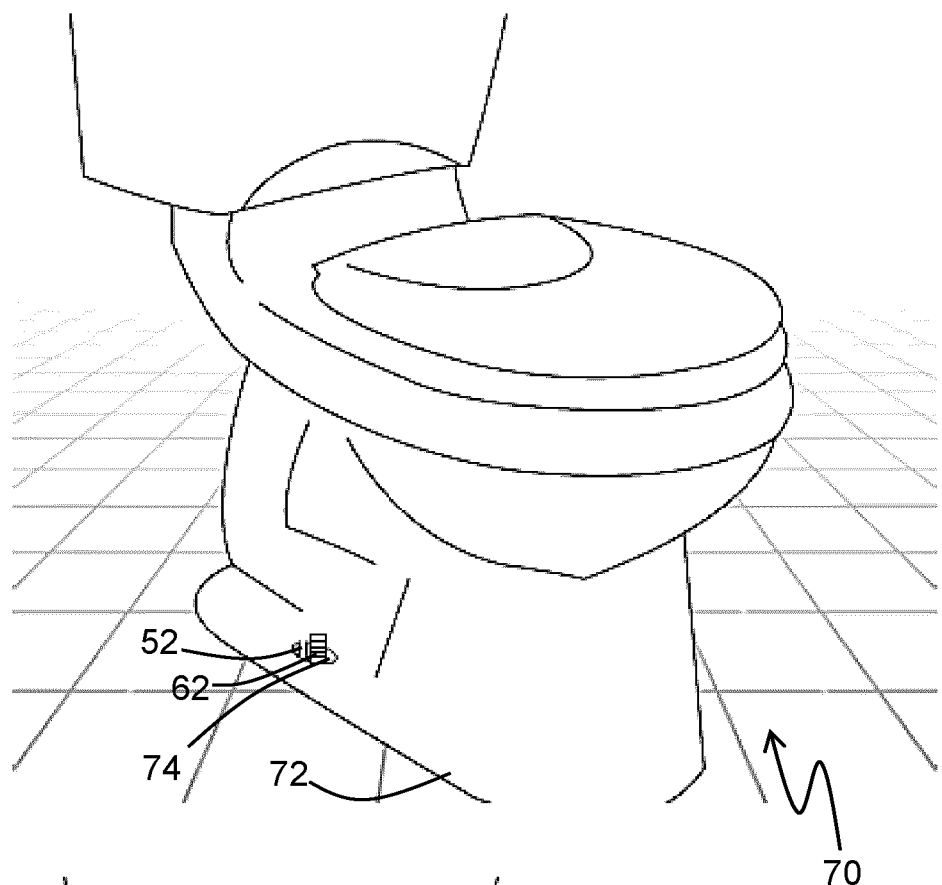
Figure 6:
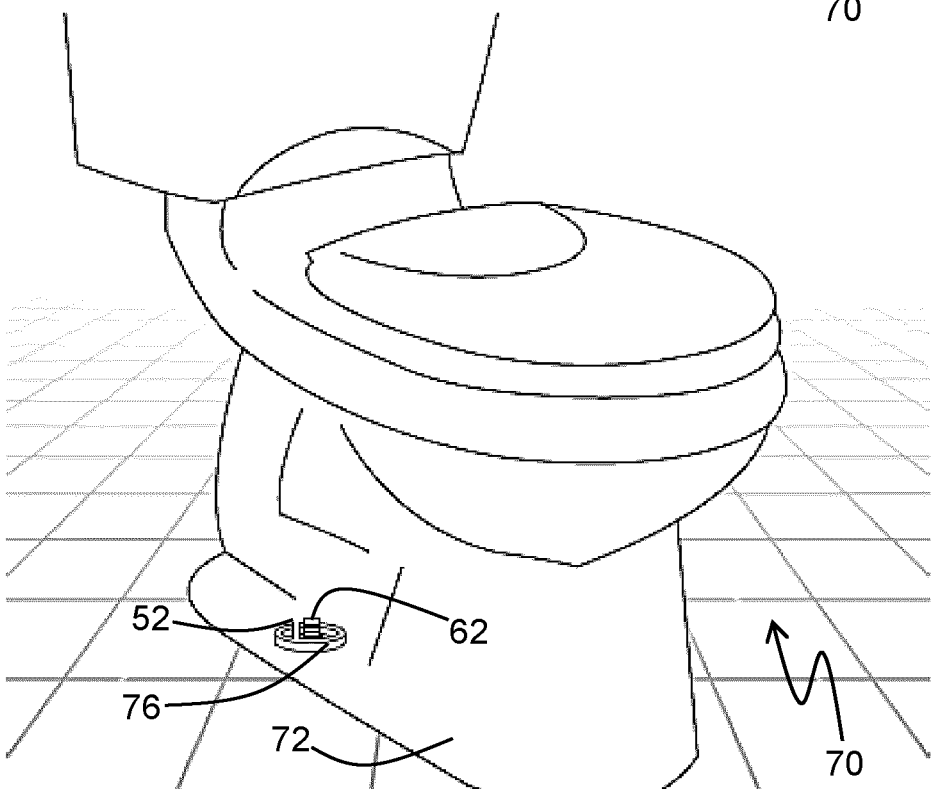
Figure 6:
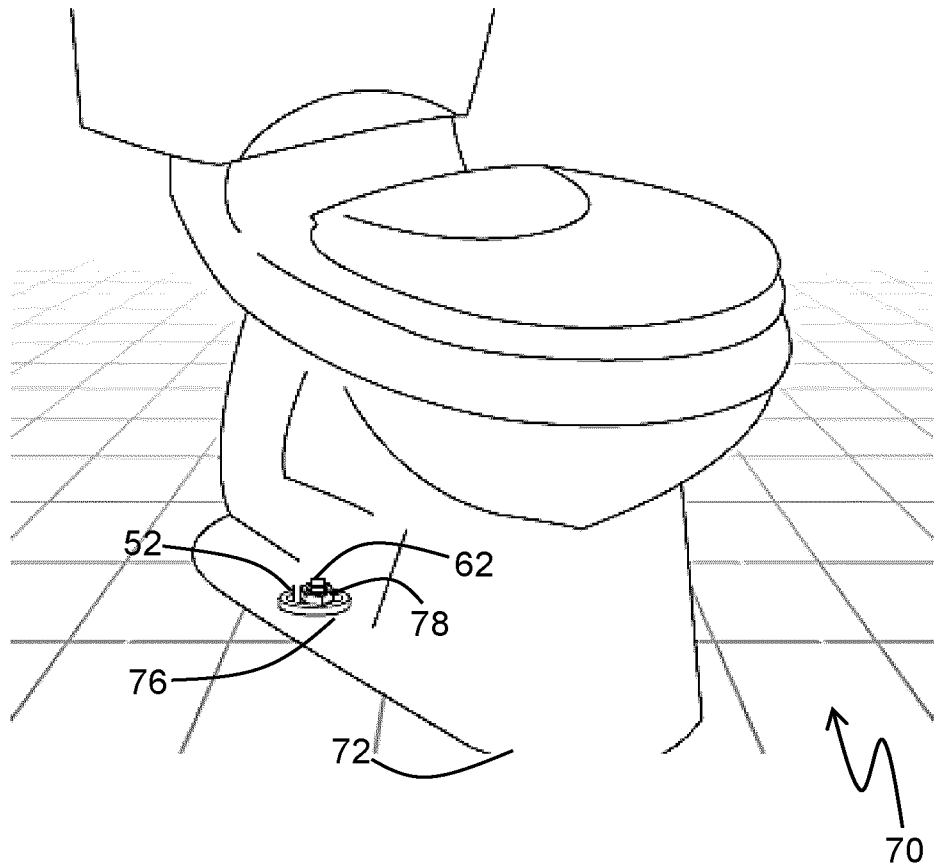
Figure 6:
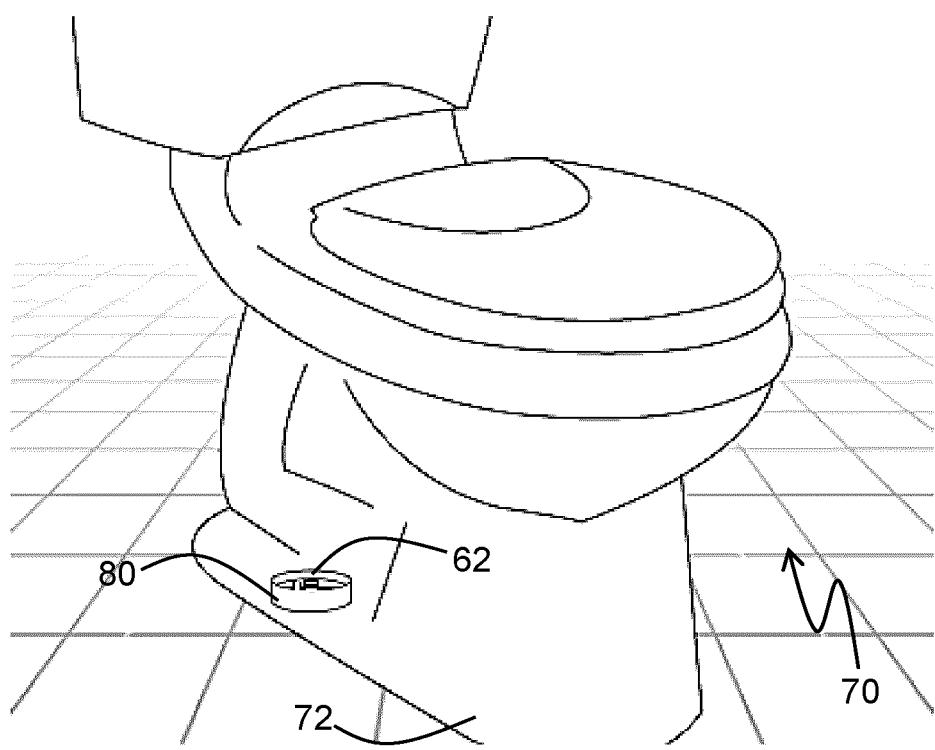
Figure 6:
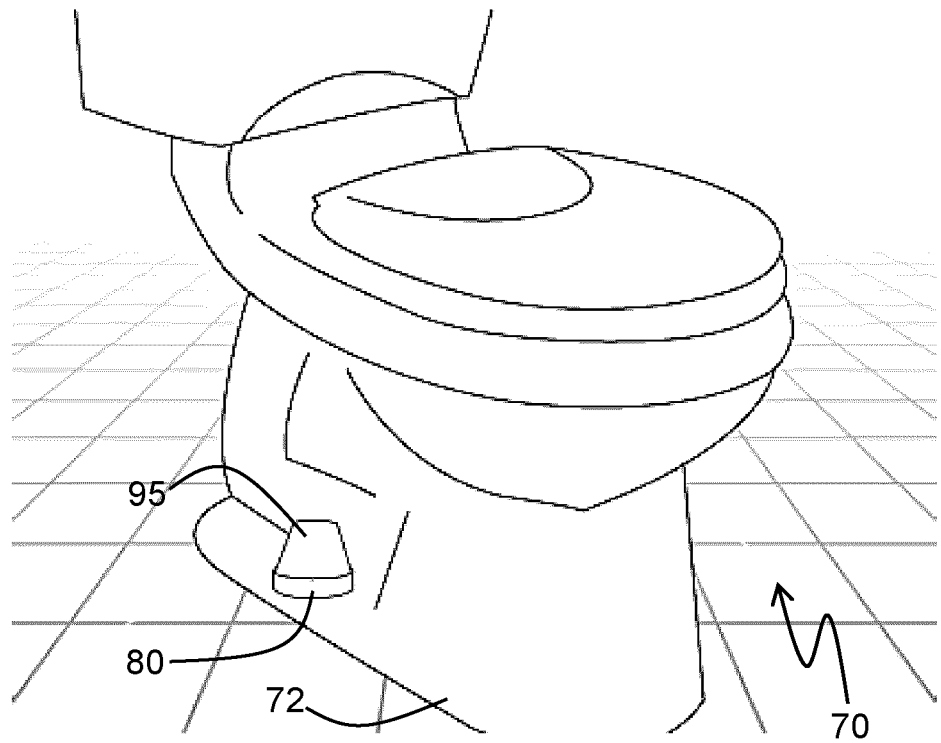
Figure 6:
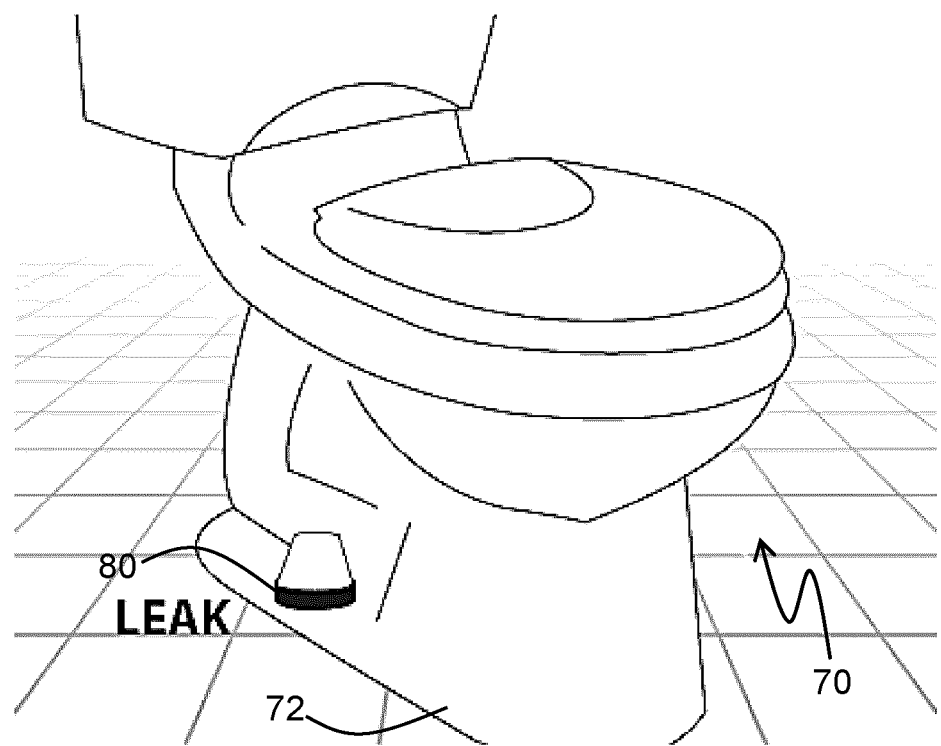

During installation as shown in FIGS. 4, 5 and 6, the leak detector 50 is aligned so that second aperture 20 and third aperture 22 receiving bolts 62 that are placed through flange bolt holes 64 in the flange 60 of a flanged waste water drain pipe. The leak detector 50 abuts flange 60. Rubber or wax gasket 66 is a sealing ring placed above the leak detector 50 (FIGS. 6A and 6B). Toilet 70 is aligned so that toilet bolt holes 74 formed within toilet base 72 receive both bolts 62 and wick material projections 52 (FIG. 6C), and that the outlet (not shown) of the toilet 70 abuts and deforms rubber/wax gasket 66 to produce a water tight sealing ring between the toilet outlet and flanged waste water drain pipe. The wick material projections 52 and the bolts 62 both extend above the toilet bolt holes 74. A toilet cap washer 76 having a perimeter larger than the perimeter of the toilet bolt hole 74 and a centrally located washer aperture 77 sized to receive both wick material projections 52 and bolt 62 is placed to cover each toilet bolt hole 74 (FIG. 6D) while allowing the wick material projections 52 and bolt 62 to extend through the washer aperture 77. A nut 78 of suitable dimensions is threaded onto bolt 62 to fix washer 76 to cover toilet bolt hole 74 (FIG. 6E). The wick material projections 52 continue to extend substantially parallel to the axis of the bolt 62 beside the body of the nut 78. A liquid sensor ring 80 is then aligned to communicate with wick material projections 52 and is snap-fitted to toilet cap washer 76 (FIG. 6F). A toilet cap dome 95 is then snap-fitted to liquid sensor ring 80 (FIG. 6G).

FIGS. 5A and 5B provide a detailed illustration of communication of wick material projections 52 with liquid sensor ring 80. Liquid sensor ring 80 comprises an outer shell 82 coupled to an inner liquid sensor comprising concentric layers of an absorbent napkin 84 and a diffusible dye substrate 86. The absorbent napkin 84 is composed of an absorbent material that extends radially inwards coupled to and supported by a T-shaped bracket 88. The base of T-shaped bracket 88 is coupled to the outer shell 82 with a longitudinal arm of the T-shaped bracket 88 extending radially inwards in between wick material projections 52 and optional projection tabs 54 that may be coupled to the wick material projections 52 and base sheet 12. The absorbent napkin 84 runs continuously along both sides of the longitudinal arm of the T-shaped bracket and extends continuously along a lateral arm of the T-shaped bracket to abut and achieve a fluid communication contact with ends of the wick material projections 52. The outer shell 82 comprises a non-opaque (eg., transparent or semi-transparent) window for visual inspection of the absorbent napkin 84 which exhibits a color change upon absorbing sufficient moisture from the wick material projections 52 to release and absorb a diffusible water soluble dye from the diffusible dye substrate 86.

Projection tab 54 and T-bracket 88 have a slower water absorbent rate than wick material projections 52 and may even be water-impermeable, while absorbent napkin 84 is made of an absorbent material that can have a higher absorbent rate than wick material projections 52. Accordingly water flowing through wick material projections 52 is preferentially absorbed by absorbent napkin 84 and the wet absorbent napkin 84 becomes colored by the transfer of diffusible dye from the diffusible dye substrate 86 to the absorbent napkin 84.

The outer shell 82 forms a ring comprising first and second opposing axial ends, 90 and 92. The first axial end 90 provides a hook for reversible snap-fit to a corresponding lip formed at a perimeter of the washer 76. The second axial end provides a hook for reversible snap-fit attachment to a corresponding hook formed at a perimeter of an open end of toilet cap dome 95.

In operation, the leak detector 50 is installed in a toilet discharge outlet connection with a flanged waste water drain pipe as shown in FIG. 6, with the first aperture 18 coaxially aligned with the flange 60 of the flanged pipe, the first aperture 18 having an area sized to concentrically receive the interior diameter of the pipe, or the interior diameter of a flange or a gasket used to facilitate the pipe connection.

When a leak occurs, liquid accumulates or beads on the base sheet 12 and flows towards and contacts the wick material barrier that continuously surrounds the aperture 18 except optionally for one or more gap regions defined by a pair of wick material projections 52 extending axially upward from the wick material barrier or one or more gap regions independent of wick material projections.

Liquid taken up by a portion of the wick material barrier disperses sequentially through adjoining portions of the wick material barrier until a wick material projection is reached.

The wick material projection abuts and is in fluid communication with the absorbent napkin 84 housed within the liquid sensor ring 80 allowing the absorbent napkin 84 to draw off liquid from the wick material projection 52. The absorbent napkin 84 and the diffusible dye substrate 86 combine together to form a liquid sensor. The liquid sensor changes from a first resting state (dry) to a second activated state (wet) upon exposure to a target liquid, for example water.

The liquid sensor may be observed by visual inspection as the outer shell 82 of the liquid sensor ring 80 comprises at least a sufficiently sized window composed of a non-opaque material. FIG. 6G shows the liquid sensor in a resting/dry state showing a first color (white), while FIG. 6H shows the liquid sensor in an activated/wet state after exposure to a liquid indicating a second color (black).

The toilet bolt cap liquid sensor provides several advantages including a robust attachment of the liquid sensor within a leak detection system and minimizing potential mechanical contact of the liquid sensor with those using or cleaning the toilet.

When in use the leak detector described herein displays two functional properties, leaked liquid channeling and exogenous liquid isolation.

A leaked liquid is captured by the wick material barrier and channeled through the wick material barrier to a wick material projection. The channeling may be enhanced by placing a gap region in the wick material barrier at its junction with a wick material projection. Channeling may also be enhanced by fluid communication between the wick material projection and the absorbent material of the liquid sensor. Channeling may also be enhanced by a series of ribs in between the aperture and the wick material barrier, the ribs extending in a radial direction defined by the aperture. The ribs reduce the surface area for accumulation of leaked liquid and force leaked liquid to flow into the troughs in between ribs and flow to the wick material barrier. Channeling may also be enhanced by a slope in the base sheet in between the aperture and the wick material barrier. The base sheet may be tapered so that the thickness of the base sheet decreases in a radial direction of the aperture in between the aperture and the wick material barrier. Channeling may also be enhanced by contacting a portion of the wick material projection with a water-impermeable material.

An exogenous liquid is isolated from the channeling structures by surrounding the wick material projection, the gap region, the absorbent material, the liquid sensor or any combination thereof with a liquid-impermeable material. Isolation may be enhanced by the base sheet comprising a layer of liquid-impermeable material. Isolation may also be enhanced by placing a liquid-impermeable barrier between the wick material barrier and the outer perimeter of the base sheet, the liquid-impermeable barrier surrounding the wick material barrier and extending from the base sheet surface in a generally perpendicular direction to the base sheet.

In some embodiments, the toilet bolt cap liquid sensor may display functional properties of leaked liquid channeling or exogenous liquid isolation. Absorbent material projections and/or wick material projections that extend downward from an inner surface of the cap structure to or proximal to any one or any combination of the flange, the bolt holes, the base or the wick material barrier can provide channeling of leaked liquid to the liquid sensor. Placing the liquid sensor within a toilet bolt cap structure provides a water impermeable cover to isolate the liquid sensor from exogenous liquid.

An illustrative version and several variants of a toilet bolt cap liquid sensor and a leak detector have been described above without any intended loss of generality. Further examples of modifications and variation are now provided. Still further variants, modifications and combinations thereof are contemplated and will be apparent to the person of skill in the art.

A toilet bolt cap liquid sensor comprises an outer shell defining an interior cavity sized to receive a portion of a toilet bolt; and a liquid sensor housed within the outer shell. The liquid sensor may comprise an absorbent material. However, liquid sensors without absorbent materials are also contemplated. The shape of the outer shell may be any shape suitable for a toilet bolt enclosure including, for example, a ring and/or a dome.

The toilet bolt cap liquid sensor may be used more generally as a bolt cap liquid sensor in any flanged pipe connection.

The size and shape of each of the components in the leak detector can tolerate extensive variation, and will depend on the size and shape of the components of a pipe connection, typically the pipe, the flange, the gasket or any combination thereof and may also depend on the shape and size of a covering structure such as the base of a toilet. The size and shape of each of the components of the toilet bolt cap liquid sensor can also tolerate extensive variation, and can depend on components of a bolted connection to a flanged pipe, typically the dimensions of the bolt, the dimensions of the toilet bolt hole formed in the toilet base to receive the bolt, the dimensions of the nut engaging the bolt or any combination thereof.

The choice of wick material can tolerate variation. Any material that can take up liquid and provide pores for the liquid to flow through capillary action may be used. Typically, sponges, foams and fabrics may be useful. The fabric may be woven or non-woven and may be natural or synthetic. Felt is an example of a synthetic non-woven fabric. Rayon felt, polyethylene felt or polypropylene felt are popular examples of felt. Further examples of useful materials may be selected from wool, cotton, sponge, polymers (eg. polyvinyl alcohol, polyvinylacetate, polyethylene, polypropylene), hemp, paper, bamboo, microfiber, wood or cork.

The leak detector will typically have at least one wick material projection extending axially from the wick material barrier, unless the toilet bolt cap liquid sensor comprises a projection extending downwards from the interior cavity of the toilet bolt cap. The wick material projection will be in fluid communication with the wick material barrier. In other examples a pair of substantially parallel wick material projections extend axially from a gap region in the wick material barrier. Examples of one or more wick material projections in the presence or absence of gap regions are described in co-pending and co-owned US Patent Publication 2014/0208831 by Ghodrati (published 31 Jul. 2014) and all such examples may be modified and adapted for use in combination with the toilet bolt cap liquid sensor.

Examples of variants for the wick material barrier include a continuous or substantially continuous wick material barrier. A substantially continuous wick material barrier defines one or more gap regions. Gap regions may be associated with a junction of the wick material barrier with the wick material projection, with such gap regions typically having a length less than 10%, 9%, 8%, 7%, 6%, 5%, 4%, 3%, 2% or less than any percentage therebetween of the total distance of the perimeter of the wick material barrier. Where the gap region is associated with a pair of wick material projections, the gap region is maintained along the entire length of the pair of wick material projections, in that the pair of wick material projections do not abut each other at any point. Gap regions may also be independent of the wick material projection, where the purpose of the gap region is to divide the wick material barrier into sectors, with such gap regions typically having a length less than 5%, 4%, 3%, 2%, 1%, 0.5% or less than any percentage therebetween of the total distance of the perimeter of the wick material barrier.

The first aperture size and shape may be varied according to the application of the leak detector. The size and shape of the first aperture is related to one or more structures in a pipe connection, typically a pipe, a flange or a gasket. The first aperture size and shape will typically range to approximate the interior surface and/or the exterior surface of the pipe, but in certain applications the first aperture size and shape may depend on the size and shape of the gasket and/or the flange.

The choice of base sheet material can tolerate variation. The base sheet material may be plastic, elastomer, rubber, paper, metal and the like. The base sheet material is characterized by an absorbent rate and/or wicking capacity less than the absorbent rate or wicking capacity of the wick material. The thickness of the base sheet will typically range from 0.1 to 3 mm for most residential piping connections. However, the thickness may be greater for large piping applications, such as industrial or public infrastructure piping. The base sheet may be of any convenient shape and will depend on the shape of the piping connection and any coverings or structures causing visual obstruction.

The absorbent napkin 84 is composed of an absorbent material. The choice of the absorbent material of the liquid sensor can tolerate variation. The absorbent material is characterized by an absorbent rate and/or wicking capacity greater than the absorbent rate or wicking capacity of the wick material. Absorbent materials may be selected from the same groups of materials that wick materials are chosen from. Many examples of absorbent materials may be found in the tissue paper, paper towel, baby diaper and feminine napkin industries as materials used in these devices are developed to quickly absorb and disperse liquid.

Assays to determine absorbent rate and wicking capacity are known. For example, U.S. Pat. No. 5,830,558 describes such an assay. A useful assay is also described in co-pending and co-owned US Patent Publication 2014/0208831 by Ghodrati (published 31 Jul. 2014).

The toilet bolt cap liquid sensor may function with or without a bracket for supporting a radially inward projection of the absorbent material of the liquid sensor. When a bracket is optionally used the bracket may be any shape or form that supports an inward projection of the absorbent material and allows sufficient contact between the absorbent material and wick material projection to allow communication of fluid from the wick material projection to the absorbent material.

When a bracket is included the bracket may be any convenient shape for example T-shape (as shown in FIG. 5), L-shape, U-shape, O-shape, C-shape brackets may all be used. The bracket may also be a collapsible/extendible bracket, or a swivel bracket couple to an inner surface of the toilet bolt cap liquid sensor. When a bracket is not used one or more nubs projecting inward may be used to provide a surface to support a radially inward projection of the absorbent material. Brackets may be connected to a cap, a ring, a washer or combinations thereof as desired for a specific implementation.

A radially inward projection of the absorbent material is also optional, in that the absorbent material may be devoid of inward projections if the wick material projection is angled to contact the absorbent material or an inner surface of a toilet bolt cap. For example, the wick material projection 52 may be biased to project at an appropriate angle to contact the absorbent material by coupling to a projection tab that is biased to the appropriate projection angle, or an internal wire co-extensive and co-axial within the wick material projection providing a bias to an appropriate angle. Thus, the angle of the wick material projection 52 relative to base sheet 12 of leak detector 50 may be any angle suitable to contact the absorbent material. Typically, the angle will be substantially perpendicular relative to base sheet 12, and in certain examples the angle may range from 60 degrees to 120 degrees relative to base sheet 12 depending on the size of an inward projection of the absorbent material. The size and shape of washer aperture 77 of toilet cap washer 76 may be adjusted depending on the angle of the wick material projection.

The toilet bolt cap liquid sensor may function without wick material projections 52. For example, absorbent material projections could extend downward from the liquid sensor ring 80 to contact the wick material barrier of the base sheet 12 of leak detector 50. The toilet bolt cap liquid sensor may also function without leak detector 50. For example, the liquid sensor ring 80 could be configured to comprise an absorbent material projection or a wick material projection that extends from the liquid sensor along the bolt 62 downward to the flange 60—this example provides a functional solution for leak detection of liquid leaking to the bolt connection or bolt holes 64 region of the flange 60, but assumes an increased risk of false negatives due to the absence of the wick material barrier and the base sheet.

The toilet bolt cap liquid sensor and the leak detector can function independently of each other, but combine together to form a leak detection system that provides advantages over use of each device alone. A leak detection system comprising a toilet bolt cap liquid sensor and a leak detector provides an advantage of a more robust attachment of the liquid sensor compared to the prior art leak detector shown in FIG. 1. Another advantage is avoidance of potential mechanical contact of the liquid sensor with those using or cleaning the toilet.

The toilet bolt cap liquid sensor and the leak detector combination may be packaged as a kit to be used to install a leak detection system when fastening a toilet to a flanged waste water drain pipe such as a toilet flange or a closet flange. The kit may comprise additional components for installing a leak detection system while fastening a toilet to a flange. For example, the kit may further comprise any one of or any combination of a gasket (e.g., a wax ring, a reinforced wax ring, a flexible waxless seal, a rubber ring), a flange (e.g., a flange extension ring, a toilet flange, a closet flange), one or more shims (eg, wedge pieces for leveling a toilet base), one or more bolts (eg., closet bolts for fastening a toilet base to a closet flange), one or more nuts, one or more washers, or any other device for fastening a toilet to a flange, and may also include instructions for installation for any one of or any combination of the toilet bolt cap liquid sensor, the leak detector, the gasket, the flange, the shims, the bolts, the nuts, the washers or any other device for fastening a toilet to a flange.

The toilet bolt cap liquid sensor may be configured to accommodate many different types of liquid sensors. The liquid sensor can be, for example, a color-changing paper similar to litmus paper or other pH sensitive paper, a paper with a liquid diffusible dye, or an electronic sensor configured to emit a visible and/or audible signal when the electronic sensor detects a liquid. The liquid sensor can produce and/or transmit any suitable signal (either wirelessly or via a connection wire) in response to the detection of a leak. For example, the liquid sensor (and/or a receiving circuit disposed outside of the toilet base) can produce a signal with an audible alarm. In another example, the liquid sensor (and/or a receiving circuit disposed outside of the toilet base) can produce a signal that is received by a wireless device (e.g., a text message, an electronic page, an e-mail or the like) or a signal that is received by a monitoring service (e.g., a home alarm monitoring service). Further examples of liquid sensors may be found in US Patent Publication No 2011/0209278 (published 1 Sep. 2011).

The toilet bolt cap liquid sensor may be configured to accommodate many different types of toilet bolt cap design or structure. For example, toilet bolt caps described in Canadian Patent Application No 2160514 (published 14 Apr. 1997), U.S. Pat. No. 9,033,633 (published 19 May 2015) or US Patent Publication No 2014/0053326 (published 27 Feb. 2014) may all be configured to produce a toilet bolt cap liquid sensor. The toilet bolt cap liquid sensor may be adapted to any suitable cap structure including a 3-piece cap, a 2-piece cap or a 1-piece cap. For example, a 3-piece cap (shown in FIG. 5A) comprises a washer 76, a liquid sensor ring 80 and a toilet cap dome 95 with the liquid sensor ring comprising first and second opposing axial ends 92 and 90 providing reversible fasteners for coupling to the toilet cap dome 95 and washer 76, respectively. Examples of a 2-piece cap include an integrated cap dome 95 and liquid sensor ring 80 coupled to a separate washer 76; or an integrated liquid sensor ring 80 and washer 76 coupled to a separate cap dome 95. Examples of a 1-piece cap include an integrated cap dome 95, liquid sensor ring 80, and washer 76 with the washer aperture 77 sized for friction fit engagement with nut 78; or in an alternative example having washer 76 axially raised so that axial end 90 remains open providing a receptacle for receiving nut 78 under washer 76 and washer aperture 77 configured for either friction fit or threaded engagement with bolt 62.

Within the toilet bolt cap structure, the washer 76 is optional if the liquid sensor ring 80 and/or cap dome 95 comprises an integrated blind threaded bore for threadably engaging bolt 62 or an integrated unthreaded bore for friction fit of bolt 62. The cap dome 95 is also optional if the liquid sensor ring 80 comprises a closed or substantially closed water-impermeable cover concentrically layered over the absorbent material to prevent exogenous liquid that may enter from an open top from contacting the absorbent material. Many different shapes and sizes of cap structures may be accommodated, for example a domed cap coupled to a washer without an intervening ring, with the liquid sensor housed in the domed cap.

Another example of a cap structure is a pivoting cap structure comprising a pivot joint for coupling cap dome 95 to a liquid sensor ring 80 or to a washer 76. The pivot may be a peripheral axially-aligned swivel having a pivot axis that is substantially parallel to the longitudinal axis of the cap dome 95, so that the longitudinal axis of cap dome 95 in a swivelled open position is substantially parallel to its longitudinal axis in a closed position. The pivot may be a peripheral tangential hinge having a pivot axis that is substantially perpendicular to the longitudinal axis of the cap dome 95, so that the longitudinal axis of cap dome 95 in a pivoted open position is angular compared to its longitudinal axis in a closed position. A pivoting cap joint may be used in combination with any of the 3-piece, 2-piece or 1-piece cap structures.

Figure 7:
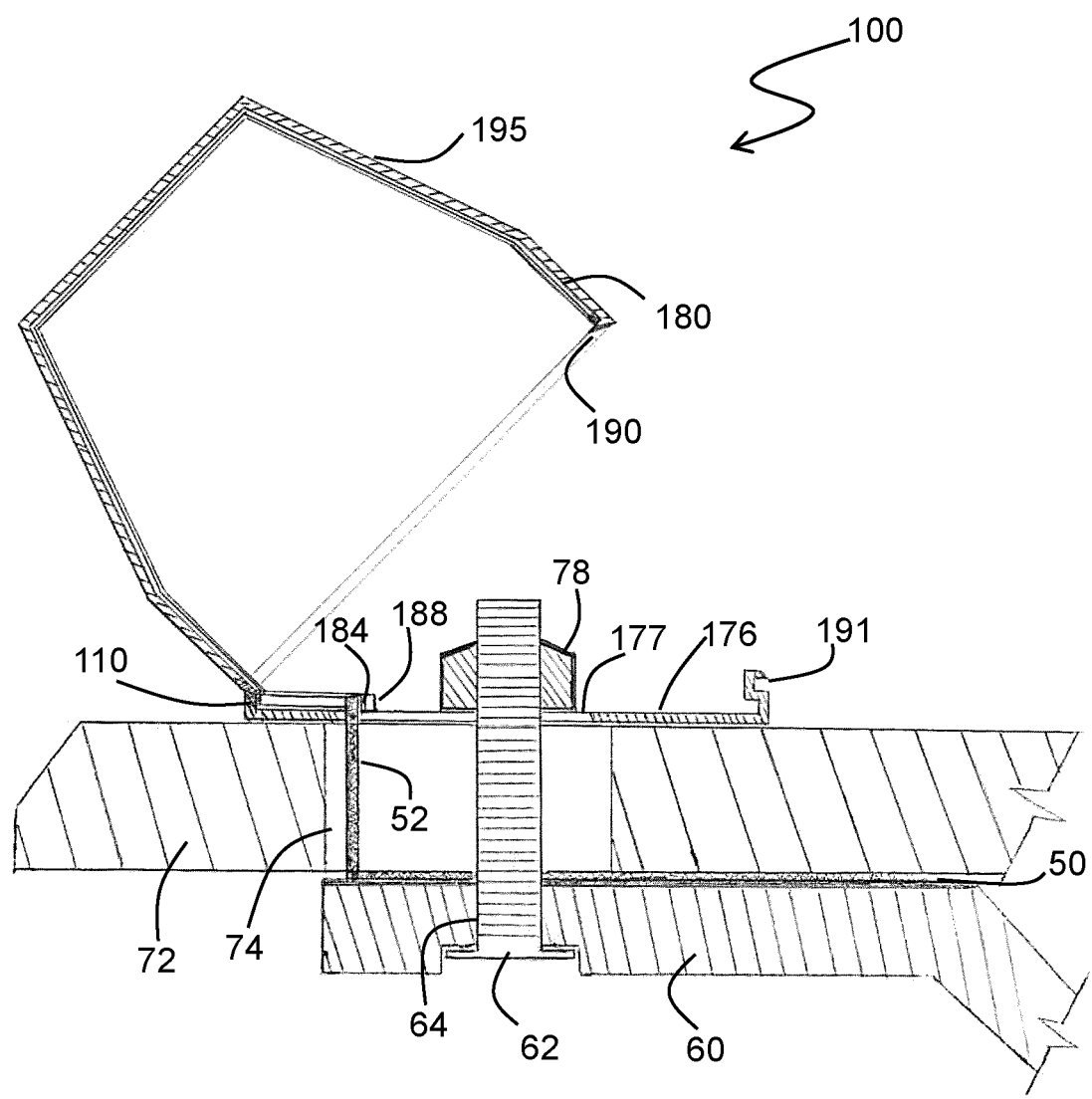
FIG. 7 shows an axial cross-section view of an open position of a pivotable variant of the toilet bolt cap liquid sensor shown in FIG. 5A.

FIG. 7 shows an example of a pivotable variant 100 of the toilet bolt cap liquid sensor shown in FIG. 5. Pivotable variant 100 comprises a cap dome 195 integrally formed with a liquid sensor ring 180 and the liquid sensor ring 180 is pivotably connected to a washer 176. The pivot connection is a peripheral tangential hinge 110 having a pivot axis that is substantially perpendicular to the longitudinal axis of the cap dome 195. Liquid sensor ring 180 and washer 176 each comprise correspondingly aligned mating peripheral hooks, 190 and 191 respectively, for reversible snap-fit attachment of the liquid sensor ring 180 to the washer 176 for latching in a closed position. Liquid sensor ring 180 comprises an outer shell coupled to an inner liquid sensor comprising concentric layers of an absorbent napkin 184 and a diffusible dye substrate. The absorbent napkin 184 is composed of an absorbent material that extends through or on hinge 110 and radially inwards along washer 176 to abut and achieve a fluid communication contact with ends of the wick material projections 52 of leak detector 50. The absorbent napkin 184 may comprise multiple pieces that abut each other for fluid communication, for example, the absorbent napkin 184 may comprise a first portion within the liquid sensor ring and a second portion that extends radially inwards along washer 176, the first portion abutting the second portion at or proximal to hinge 110. T-shaped bracket 188 supports absorbent napkin 184 and its contact with wick material projections 52. T-shaped bracket 188 is coupled to washer 176 and is sized to extend to wick material projections 52 that extend axially upwards through washer aperture 177. The hinge 110 may be placed anywhere along the axial length of the liquid sensor ring 180 and/or cap dome 195. For example, liquid sensor ring 180 could be integrated with washer 176 and a pivot joint such as hinge 110 could couple cap dome 195 to liquid sensor ring 180 with corresponding mating hooks formed in the peripheral rims of the cap dome 195 and liquid sensor ring 180 for reversible snap-fit attachment in a closed position. Many different pivot types and orientations may be accommodated.

The cap structures described herein are developed for use as a liquid sensor, but may also find use without incorporation of a liquid sensor. For example, a pivoting cap structure may find general use in the absence of a liquid sensor in that a pivoting cap structure with a pivot joint coupling cap dome 195 to liquid sensor ring 180 and/or washer 176 allows for mechanical access to nut 78 while maintaining washer 176 operably linked to bolt 62 and maintaining washer 176 linked to liquid sensor ring 180 and/or cap dome 195. Another example of utility in the absence of a liquid sensor, is that liquid sensor ring 80 can function as a spacer (eg., for long bolts) or an ornamental ring for retrofit with existing cap dome 95 and washer 76 cap structures.

The overall cap structure or any of its components such as cap dome 95, liquid sensor ring 80 or washer 76 may be adapted to any suitable shape, size or color.

The liquid sensor need not be constrained within liquid sensor ring 80 and may extend to or be distributed within any part of the overall cap structure including top, bottom or sides of the cap dome 95 or the washer 76. When leak detection occurs, the liquid sensor can provide a visible indicator anywhere on the cap structure including all or part of the cap dome 95 and/or all or part of the liquid sensor ring 80. When a visible indicator is used, at least a portion of the outer shell of the cap structure comprises a non-opaque (eg., transparent or semi-transparent) window to allow for visual inspection of the visible indicator. The size and distribution of the visible indicator within a toilet bolt cap may be as large or small as desired for a specific implementation.

A liquid-impermeable material may optionally be used to form a liquid-impermeable enclosure capturing wick material projections and/or portions of a base sheet at or proximal to the wick material projections, a liquid-impermeable barrier in between the outer perimeter of the base sheet and the wick material barrier, and/or to provide the base sheet with a liquid-impermeable property. A liquid-impermeable material may also be used to form a liquid-impermeable enclosure capturing portions of absorbent material of the toilet bolt cap liquid sensor and/or absorbent material projections or wick material projections extending from the toilet bolt cap liquid sensor when the leak detector 50 is absent or when leak detector 50 is configured without wick material projections 52. The toilet bolt cap structure typically comprises an outer shell made of a water-impermeable material and provides a water impermeable shell for housing the liquid sensor. The choice of liquid-impermeable material used in any one of the liquid-impermeable enclosure, liquid-impermeable barrier or liquid-impermeable layer of the base sheet may also tolerate variation. The liquid-impermeable material can be a single film layer, a laminate or multilayer film. The liquid-impermeable material may comprise a layer of film comprising, for example a polymer selected from polymers in the group consisting of: polyamides; ethylene vinyl alcohol copolymers; polyvinylidene chloride; and polyolefins. Further examples of liquid impermeable materials are described in co-pending and co-owned US Patent Publication 2014/0208831 by Ghodrati (published 31 Jul. 2014).

Embodiments described herein are intended for illustrative purposes without any intended loss of generality. Still further variants, modifications and combinations thereof are contemplated and will be recognized by the person of skill in the art. Accordingly, the foregoing detailed description is not intended to limit scope, applicability, or configuration of claimed subject matter.

What is claimed is:

1. A leak detector system for a toilet comprising:
   a flat base sheet bound by an outer perimeter an interior aperture;
   a wick material barrier coupled to the base between the aperture and the outer perimeter in a continuous or substantially continuous strip around the aperture;
   a wick material projection extending from the wick material barrier; and
   a toilet bolt cap comprising an outer shell defining an interior cavity for receiving an end of a toilet bolt, the toilet bolt cap housing a liquid sensor; the liquid sensor comprising an exposed surface to the interior cavity for contact in fluid communication with the wick material projection;
   wherein the liquid sensor comprises a visible indicator that changes from a dry state to a wet state and the outer shell of the toilet bolt cap comprises a window for visual inspection of the visible indicator.

2. The leak detector system of claim 1, wherein the liquid sensor comprises a water-absorbent material in fluid communication with the wick material projection within the interior cavity of the toilet bolt cap.

3. The leak detector system of claim 2, wherein the absorbent rate of the water-absorbent material is greater than the absorbent rate of the wick material projections.

4. The leak detector system of claim 1, further comprising a liquid-impermeable material coupled to the base sheet and surrounding at least a portion of the wick material projection.

5. The leak detector system of claim 1, wherein the wick material barrier is interrupted by one or more gap regions.

6. The leak detector system of claim 5, wherein the length of each gap region is less than 5% of the total distance of the perimeter of the wick material barrier.

7. The leak detector system of claim 1, wherein the toilet bolt cap is selected from the group consisting of: a 3-piece cap structure comprising a dome, a ring and a washer; a 2-piece cap structure comprising an integrated dome and ring and a reversibly attachable washer; a 2-piece cap structure comprising an integrated ring and washer and a reversibly attachable dome; a 1-piece cap structure comprising an integrated dome, ring and washer; and a pivot cap structure comprising a pivot joint coupling a dome and a ring for pivoting motion of the dome from a closed position to an open position.

8. A kit comprising the leak detector system of claim 1, and instructions for installation of the leak detector system with the toilet.

9. A toilet bolt liquid sensor ring comprising:
   a tubular outer shell comprising opposing first and second open axial ends defining an interior cavity sized to receive a portion of a toilet bolt and house the liquid sensor; the liquid sensor comprising an exposed surface to the interior cavity; the first open end comprising a first connector for reversible attachment to a washer; and the second open end comprising a second connector for reversible attachment to a dome;
   wherein the liquid sensor comprises a water-absorbent material, a first portion of the water-absorbent material abuts the outer shell and a second portion of the water-absorbent material extends radially inwards within the interior cavity, and the second portion of the water-absorbent material is supported by a bracket extending radially inwards from the outer shell.

10. The toilet bolt liquid sensor ring of claim 9, further comprising a diffusible dye substrate couple to the water-absorbent material.

11. The toilet bolt liquid sensor ring of claim 9, wherein the liquid sensor comprises a visible indicator that changes from a dry state to a wet state.

12. The toilet bolt liquid sensor ring of claim 11, wherein the outer shell comprises a window for visual inspection of the visible indicator.

13. A toilet bolt liquid sensor ring comprising:
   a tubular outer shell comprising opposing first and second open axial ends defining an interior cavity sized to receive a portion of a toilet bolt and house the liquid sensor; the liquid sensor comprising an exposed surface to the interior cavity; the first open end comprising a first connector for reversible attachment to a washer; and the second open end comprising a second connector for reversible attachment to a dome, wherein the first connector is a circumferential hook for snap-fit attachment with a circumferential lip of the washer.

14. The toilet bolt liquid sensor ring of claim 13, wherein the second connector is a circumferential hook for snap-fit attachment with a corresponding circumferential hook of the dome.

\* \* \* \* \*